Figure 1:
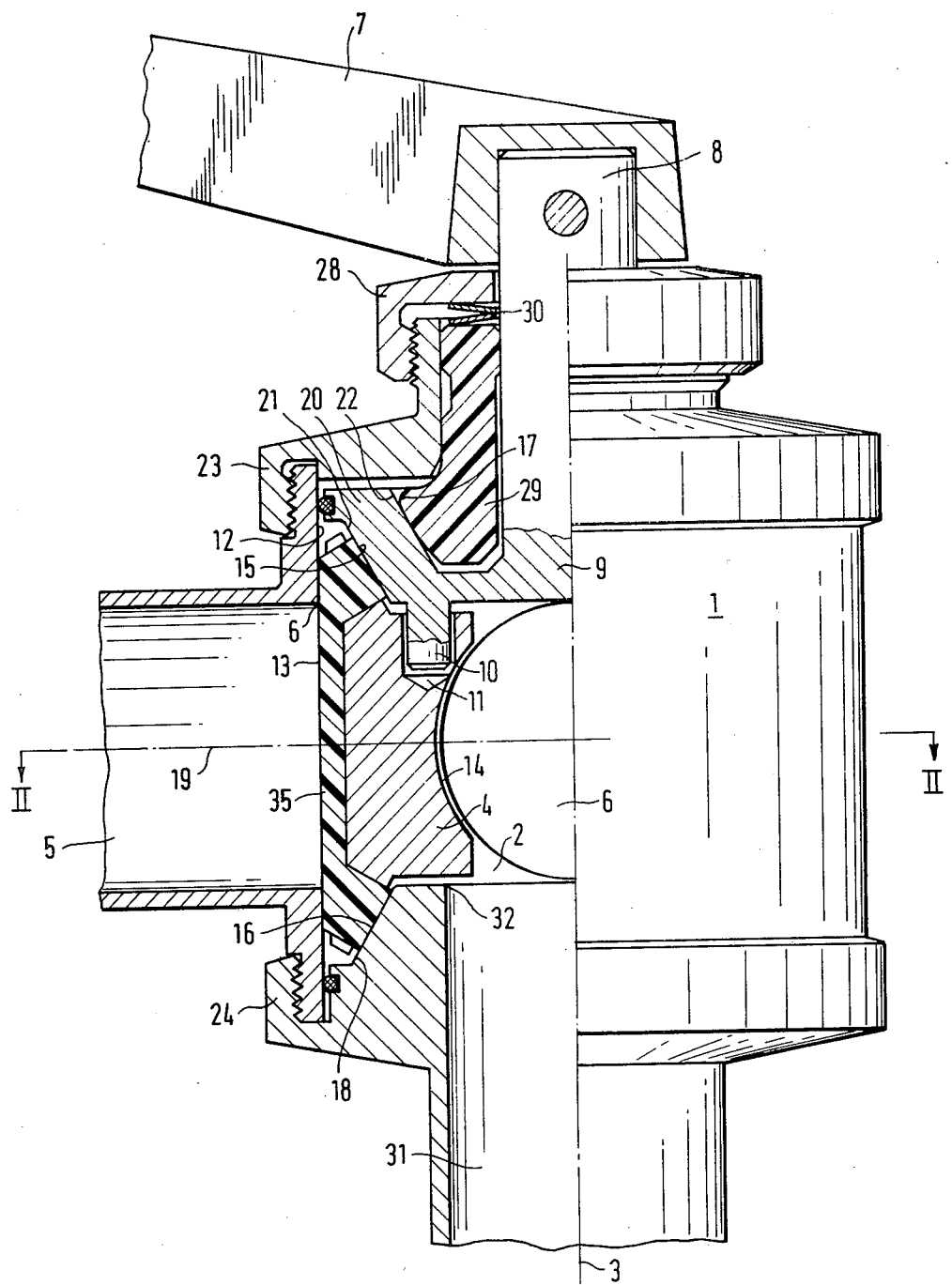

United States Patent [19]

Wulf

[11] 4,196,749
[45] Apr. 8, 1980

[54] SHUT-OFF VALVE

[75] Inventor: Günter Wulf, Wangen im Allgau, Fed. Rep. of Germany

[73] Assignee: Hermann Waldner GmbH & Co., Algau, Fed. Rep. of Germany

[21] Appl. No.: 876,938

[22] Filed: Feb. 10, 1978

[30] Foreign Application Priority Data

Feb. 10, 1977 [DE] Fed. Rep. of Germany ....... 2705626

[51] Int. Cl.$^2$ .............................................. F16K 5/18
[52] U.S. Cl. ................................ 137/625.47; 251/192
[58] Field of Search .................... 137/625.47; 251/192

[56] References Cited

U.S. PATENT DOCUMENTS

| 720,012 | 2/1903 | Erdman | 251/192 X |
|---|---|---|---|
| 1,228,469 | 6/1917 | Mueller . | |
| 1,949,191 | 2/1934 | Smolensky | 251/161 X |
| 2,084,248 | 6/1937 | Ferrari et al. . | |
| 2,103,536 | 12/1937 | Inge | 251/161 |
| 2,176,730 | 10/1939 | Church et al. | 251/182 X |
| 2,179,684 | 11/1939 | Brown . | |
| 2,198,386 | 4/1940 | Hiester et al. . | |
| 2,329,981 | 9/1943 | Church et al. | 251/182 X |
| 3,064,937 | 11/1962 | Pryor . | |
| 3,154,097 | 10/1964 | Wolff | 251/192 X |
| 3,342,453 | 9/1967 | Soila et al. | 251/184 |
| 3,536,100 | 10/1970 | Marlow | 137/625.47 |
| 3,771,765 | 11/1973 | Scapes | 137/625.47 X |
| 4,015,816 | 4/1977 | Semon | 251/192 X |

FOREIGN PATENT DOCUMENTS

| 927407 | 6/1955 | Fed. Rep. of Germany . | |
|---|---|---|---|
| 1710206 | 11/1955 | Fed. Rep. of Germany . | |
| 1236287 | 3/1967 | Fed. Rep. of Germany . | |
| 1241213 | 5/1967 | Fed. Rep. of Germany . | |
| 1241214 | 5/1967 | Fed. Rep. of Germany . | |
| 1957223 | 6/1971 | Fed. Rep. of Germany . | |
| 1078221 | 5/1954 | France . | |
| 1529689 | 5/1968 | France . | |
| 1586828 | 1/1970 | France . | |
| 175674 | 6/1961 | Sweden . | |
| 737225 | 9/1955 | United Kingdom | 251/192 |
| 864470 | 4/1961 | United Kingdom . | |
| 1170673 | 12/1969 | United Kingdom . | |

Primary Examiner—Arnold Rosenthal
Attorney, Agent, or Firm—Stevens, Davis, Miller & Mosher

[57] ABSTRACT

A valve adapted for installation in a pipe which carries foodstuffs has a housing enclosing a cylindrical bore. At least one opening in the side of the housing provides a radial pipe connection. At least one closure member of segmented cross-section is rotatably disposed in the bore for rotation into open and closed positions with respect to the openings in the side of the housing. A pipe connection is also provided at one end of the housing which opens axially into the bore. The closure member is urged by wedge surfaces radially outwards against the wall of the bore. The closure member is provided above and below the openings for pipe connections in the side of the housing with conical wedge surfaces each coaxial with the longitudinal axis of the bore and diverging away from the opening.

2 Claims, 2 Drawing Figures

U.S. Patent   Apr. 8, 1980   Sheet 1 of 2   4,196,749

SHUT-OFF VALVE

This invention relates to a shut-off valve, in particular for pipework systems carrying liquid or semi-liquid foodstuffs of the kind disclosed in my earlier application Ser. No. 764,231 filed Jan. 31, 1977. The disclosed valve has a housing having a cylindrical bore into which at least one pipe connection opens radially and with two rigidly interconnected closure members which are segmental in cross-section and which are rotatable in the bore to open and close the opening of the pipe connection which opens radially into the bore. Each closure is urged radially outwards against the wall of the bore by means of wedge surfaces, the closure member being provided, above and below the opening of the pipe connection opening radially into the bore, with respective conical wedge surfaces coaxial with the longitudinal axis of the bore and diverging away from the opening, which cooperate with complementary conical wedge surfaces on the housing, the two wedge surfaces on the housing being urged towards one another.

The shut-off valve described in my earlier application can have two rigidly interconnected closure members diametrically opposite one another or spaced apart 90° around the housing and four ports spaced apart by 90° the closure can be brought altogether into four positions, resulting in four different flow paths.

In this shut-off valve the individual pipe connections lie in a central plane perpendicular to the longitudinal axis of the bore. The number of pipe connections is accordingly limited by their diameter and by the diameter of the bore. Furthermore, the number of pipe connections provided on the valve cannot be subsequently increased.

It is an object of this invention to improve the shut-off valve described in my aforesaid application by increasing the number of available pipe connections.

The foregoing object and others are accomplished in accordance with this invention, generally speaking, by providing a shut-off valve of the type described in my aforesaid earlier application, the disclosure of which is incorporated herein by reference, with a pipe connection which opens axially into the cylindrical bore of the housing at one end of the cylindrical bore.

This invention thus provides a pipe connection which is displaced through 90° with respect to the or each of the pipe connections opening radially into the bore of the housing. This provides additional possible uses for the shut-off valve of the kind disclosed in my earlier application. In addition, there is the possibility in the shut-off valve described in my earlier application having a lower cover on the housing of increasing the number of connections subsequently by one further connection in a simple manner over and above the original number in that the lower cover is replaced by a cover having a connection having an opening axially into the bore. It is of further advantage that by the improvement there is provided a connection which cannot be shut off by the closure member, still further multiplying the possible uses.

Figure 2:
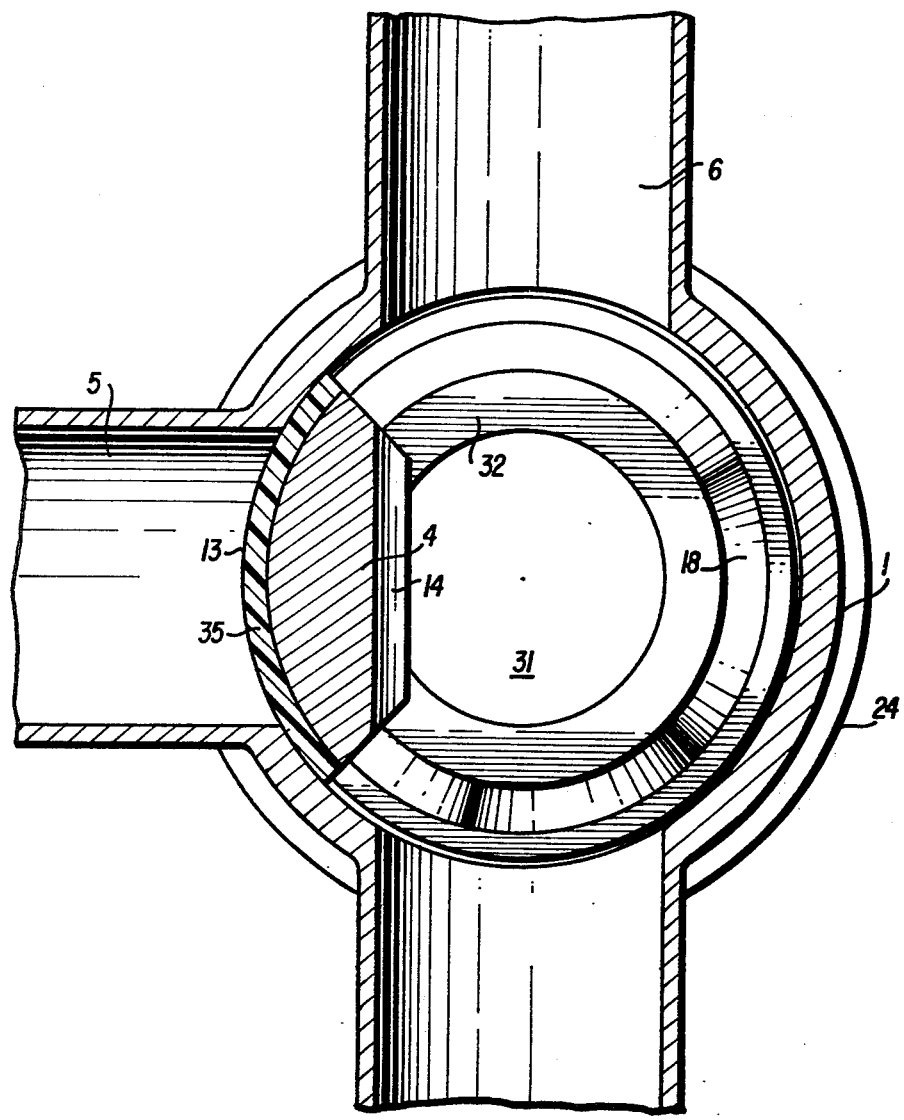

The invention is described by way of example in the following with reference to the drawing of FIG. 1 which illustrates in a partially longitudinally sectioned side view an embodiment of the improved shut-off valve of this invention, and FIG. 2 which is a sectional view along the line II—II of FIG. 1.

The shut-off valve, which is particularly suitable for pipework systems carrying foodstuffs, comprises a housing 1 with a cylindrical bore 2 and a closure member 4 which is rotatable in the bore 2 about its longitudinal axis 3. Provided on the housing 1 are three radial pipe connections 5 mutually spaced apart by 90°, each having an opening 6 leading into the cylindrical bore 2 of the housing 1. These openings 6 of the radial pipe connections 5, of which only two are visible in FIG. 1 as the third opening 6 lies diametrically opposite the central opening 6 (FIG. 2), are each capable of being sealed off by the closure member 4 as illustrated in the drawing in respect of the left hand opening 6.

For actuation of the closure member 4 there is a handle 7 which is mounted on the adjacent end, projecting from the housing 1, of an actuating spindle 8. The spindle 8 is provided on a shell-shaped follower 9 which is arranged at the end of the bore 2 of the housing 1 which is nearest the handle 7 and has on its end which is furthest from the actuating spindle 8 a peg 10 engaging in a recess 11 in the closure member 4. On operation of the handle 7 the follower 9 is turned about the longitudinal axis 3 of the bore 2 so that, by means of the peg 10, the closure member 4 is displaced along the cylindrical wall 12 of the bore 2. Instead of the handle 7 another actuating member could be provided, for example, a hydraulic or pneumatic actuating ram where the valve is to be operated automaticallly and/or from a remote point.

The closure member 4 has a cross-section, perpendicular to the longitudinal axis 3 of the bore 2 which is segmental. While the outer surface 13 of the closure member 4 has a cylindrical shape substantially coaxial with the axis 3 of the bore 2, the closure member 4 is provided on its rear face with a recess 14 having a cylindrical surface of which the radius of curvature corresponds approximately to the radius of the openings 6 of the radial pipe connections 5 and which is angularly displaced through 90° with respect to the cylindrical external surface 13 so that when the opening 6 of a radial pipe connection 5 is closed off by the member 4, the openings 6 of the other two radial pipe connections 5 are entirely free, that is to say, over their entire cross-sections.

The closure member 4 is provided on its rear face above and below the openings 6 of the radial pipe connections 5 with respective conical wedge surfaces 15 and 16 coaxial with the axis 3 of the bore 2 and diverging away from the openings 6, cooperating with complementary conical wedge surfaces 17 and 18 on the housing 1. The two wedge surfaces 15 and 16 on the closure member 4 are symmetrical with respect to one another, that is to say, to the central plane 19 of the closure member 4 that is perpendicular to the longitudinal axis 3 of the bore 2.

While the lower wedge surface 16 on the closure member 4 engages directly against the corresponding wedge surface 18 on the housing, the upper wedge surface 15 on the closure member 4 does not engage directly against the corresponding wedge surface 17 of the housing 1 but, on the contrary, the inclined rim 20 of the shell-shaped follower 19 is interposed between these surfaces 15 and 17 and it has a corresponding conical external surface 21 and internal surface 22.

The housing 1 has and upper cover 23 and a lower cover 24.

The upper cover 23 is screwed securely to the housing 1. On its end which is furthest from the housing 1 it has a screwed cap 28 through which the actuating spindle 8 projects. The upper wedge surface 17 on the housing 1 is provided on a support member 29 which is movable in the direction of the longitudinal axis 3 of the bore 2 of the housing 1 and is convexly curved in cross-section.

The support member 29 is formed as a bearing bush for the actuating spindle 8 and is arranged to be axially movable in the cover 23 of the housing 1. The two wedge surfaces 17 and 18 are urged towards one another. For this purpose a compression spring 30 in the form of a plate spring is provided between the screwed cap 28 and the adjacent end of the support member 29. Its preloading is adjustable by screwing the cap 28 on the cover 23, thereby adjusting the force with which the closure member 4 is urged against the wall 12 of the bore 2 of the housing 1.

The lower cover 24 is likewise rigidly screwed to the housing 1. It has a pipe connection 31 extending coaxial with the axis 3 of the bore 2, this connection having an opening 32 leading into the lower end of the cylindrical bore 2 of the housing 1. Also the opening 32 of the pipe connection 31 is free over almost its whole cross-section, as shown in the drawing, but, in contrast to the opening 6 of the radial pipe connections 5, it cannot be closed off by the closure member 4.

Preferably the closure member 4 is made of plastic material, at least on that face which is towards the wall 12 of the bore 2, in particular of polytetrafluoroethylene or a tetrafluoroethylene/hexafluoropropylene copolymer. For this purpose an insert or coating 35 of the appropriate plastic material can be provided on the said face of the member 4. Polytetrafluoroethylene or a tetrafluoroethylene/hexafluoropropylene copolymer give the closure member 4 outstanding sliding characteristics in contact with a housing 1 of steel, and further they give it a certain degree of advantageous resilience. Moreover, they give the necessary ability to withstand flowing foodstuffs, for example, milk or the like, as well as resistance to the usual flushing or cleaning fluids.

Modifications are possible to the embodiment described and illustrated by way of example. For example, one could also provide a number of closure members 4, in particular two diametrically opposed closure members 4, just as more radial pipe connections 5 could be provided, in particular four radial pipe connections 5, spaced apart by 90° around the periphery of the housing 1.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A shut-off valve comprising:
a housing having a cylindrical bore therein;
an actuating plug within the housing, said plug defining a downwardly and radially outwardly facing wedge surface;
at least two pipe connections radially opening into the housing;
a lower housing cover screwed to the housing, said cover having a further pipe connection defined therethrough which is substantially perpendicular to said radially opening pipe connections and defining a lower upwardly and radially outwardly facing wedge surface in the bore;
a closure member supported within the bore, said closure member defining opposite upper and lower wedge surfaces coaxial with the longitudinal axis of the housing, said lower wedge surface of the closure member being in facing abutment with the lower wedge surface of the cover and the upper wedge surface of the closure member being in facing abutment with the wedge surface on the plug.

2. A shut-off valve as claimed in claim 1, wherein said further pipe connection opens coaxially into the cylindrical bore.

* * * * *